(12) United States Patent
Branton et al.

(10) Patent No.: US 8,104,484 B2
(45) Date of Patent: Jan. 31, 2012

(54) SMOKING ARTICLES AND SMOKING MATERIALS

(75) Inventors: Peter James Branton, Southampton (GB); Stephen John Roberts, Weltevreden Park (ZA); Elma van der Lingen, Johannesburg (ZA)

(73) Assignee: British American Tobacco (Investments) Limited, London (GB)

( * ) Notice: Subject to any disclaimer, the term of this patent is extended or adjusted under 35 U.S.C. 154(b) by 790 days.

(21) Appl. No.: 11/597,673

(22) PCT Filed: May 24, 2005

(86) PCT No.: PCT/GB2005/002036
§ 371 (c)(1),
(2), (4) Date: Feb. 27, 2007

(87) PCT Pub. No.: WO2005/118133
PCT Pub. Date: Dec. 15, 2005

(65) Prior Publication Data
US 2007/0215166 A1  Sep. 20, 2007

(30) Foreign Application Priority Data
May 28, 2004  (GB) .................................. 0411988.9

(51) Int. Cl.
*A24B 15/18* (2006.01)
(52) U.S. Cl. ....................................... 131/280; 131/334
(58) Field of Classification Search .................... 131/280
See application file for complete search history.

(56) References Cited

U.S. PATENT DOCUMENTS

| 3,229,697 A | 1/1966 | Maebashi |
| 5,258,340 A * | 11/1993 | Augustine et al. ............... 502/60 |
| 7,243,658 B2 * | 7/2007 | Deevi et al. ................... 131/334 |
| 2003/0005940 A1 | 1/2003 | Dyakonov et al. |
| 2003/0075193 A1 | 4/2003 | Li et al. |
| 2003/0140933 A1* | 7/2003 | Eichel .......................... 131/334 |
| 2004/0250827 A1* | 12/2004 | Deevi et al. ................... 131/364 |
| 2005/0263164 A1* | 12/2005 | Reddy et al. .................. 131/334 |

FOREIGN PATENT DOCUMENTS

| DE | 4238640 A1 | 6/1993 |
| EP | 0499402 A1 | 8/1992 |

(Continued)

OTHER PUBLICATIONS

Yuan, Youzhu; Asakura, Kiyotaka; Kozlova, Anguelina P.; Wan, Huilin; Tsai, Khirui; Iwasawa, Yasuhiro; Supported Gold Catalysis Derived from the Interaction of a Au-phosphine Complex with as-precipitated Titanium Hydroxide and Titanium Oxide; Catalysis Today; 1998; pp. 333-342; vol. 44; Elsevier; USA.

(Continued)

*Primary Examiner* — Philip Tucker
*Assistant Examiner* — Vicki Wu
(74) *Attorney, Agent, or Firm* — Charles I. Sherman; Middleton Reutlinger

(57) ABSTRACT

A smoking article such as a cigarette, or a smoke filter or other component thereof, comprises a catalyst for the oxidation of carbon monoxide to carbon dioxide. The catalyst comprises gold, and an oxide of zinc or titanium. Titania and mixed oxides of zinc and copper or aluminum are preferred ($TiO_2$, ZnO, $ZnAlO_x$ or $CuZnO_x$). The gold preferably comprises species in the metallic state ($Au^0$), together with species in an oxidized state ($Au^{\delta+}$).

42 Claims, 1 Drawing Sheet

FOREIGN PATENT DOCUMENTS

| | | | |
|---|---|---|---|
| EP | 499402 | A1 * | 8/1992 |
| JP | 01315341 | | 12/1989 |
| JP | 09140370 | | 11/1995 |
| WO | 2004002247 | A2 | 1/2004 |
| WO | WO 2004002247 | A2 * | 1/2004 |
| WO | 2005055747 | A2 | 6/2005 |
| WO | 2005094619 | A1 | 10/2005 |

OTHER PUBLICATIONS

Yuan, Youzhu; Kozlova, Anguelina P., Asakura, Kiyotaka; Wan, Huilin; Tsai, Khirui; Iwasawa, Yasuhiro; Supported Au Catalysts Prepared from Au Phosphine Complexes and As-Precipitated Metal Hydroxides: Characterization and Low-Temperature CO Oxidation; Journal of Catalysis; Jan. 23, 1997; pp. 191-199; vol. 170; USA.

* cited by examiner

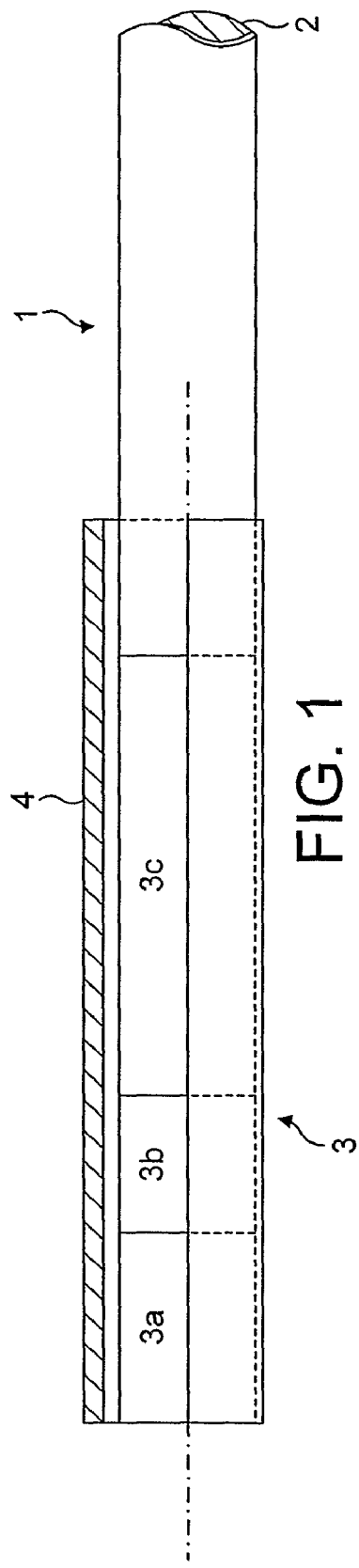
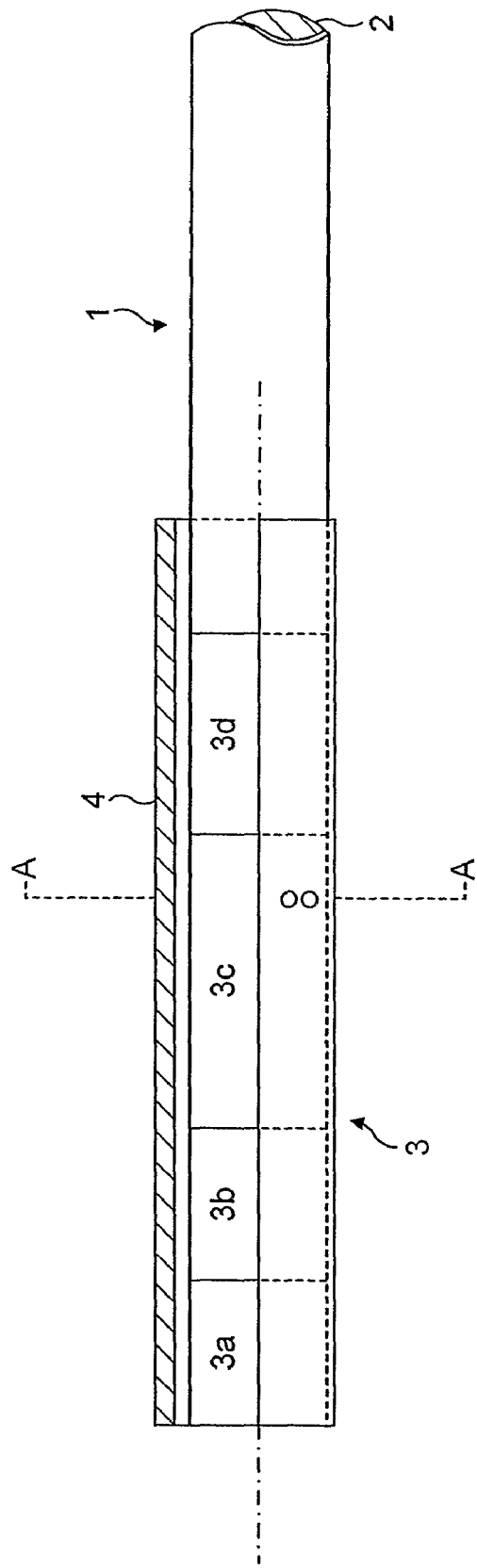

SMOKING ARTICLES AND SMOKING MATERIALS

CROSS-REFERENCE TO RELATED APPLICATIONS

This application is a national stage filing (35 U.S.C. 371), which claims priority to, and benefit from, PCT/GB2005/002036, filed on May 24, 2005, entitled "Smoking Articles and Smoking Materials."

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

This invention relates to smoking articles and smoking materials, and more particularly to such articles and materials containing a catalyst for the oxidation to carbon dioxide of carbon monoxide in the smoking decomposition products of the smoking material.

Many substances are known to act as catalysts for the conversion of carbon monoxide to carbon dioxide. For example, in *Chem. Commun.*, 1999, 1373-1374, Taylor et al disclose the use of a mixed oxide of copper and zinc for this purpose; U.S. Pat. No. 4,839,327 discloses catalysts for oxidising carbon monoxide to carbon dioxide comprising an ultra-fine deposit of gold upon metal oxides including $MnO_2$, $Fe_2O_3$, CuO, $CuMnO_2$, $Al_2O_3$, $SiO_2$, and $TiO_2$; U.S. Pat. No. 5,068,217 discloses a catalyst comprising gold deposited on a porous ceramic carrier material which contains $Fe_2O_3$; US-2003/099586 discloses a catalyst comprising gold on a carrier of $Fe_2O_3$; and U.S. Pat. No. 4,698,324 describes the deposition of gold or a mixture of gold with a catalytic metal oxide ($Cr_2O_3$, MnO, NiO, $Fe_2O_3$, $Co_3O_4$, CuO) on a carrier of silica, alumina or magnesia.

Several proposals have been made to incorporate catalysts in smoking articles and smoking materials so that carbon monoxide in the smoking decomposition products is converted to carbon dioxide. For example, international patent publication WO 2004/002247 discloses several catalysts for incorporation in a cigarette. One such catalyst comprises zinc aluminate. Another comprises gold deposited upon a rare earth oxide such as cerium oxide. US-2003/0075193 discloses a smoking material that contains a catalyst in the form of nanoparticles of metal oxides (such as $Fe_2O_3$, CuO, $TiO_2$, $CeO_2$, $Ce_2O_3$, $Al_2O_3$, or $Y_2O_3$) doped with Zr, and $MnO_2$ doped with Pd. Chinese patent specification CN-1464058 discloses a complex catalyst system for reducing the amount of carbon monoxide in tobacco smoke. The system has three active components (Au, Pt and Pd) and at least 2 promoters (Fe, Cu and, optionally, Zn) on a support made of alumina, silica, bentonite or molecular sieve material.

When a catalyst is incorporated in a smoking article, the catalyst can become rapidly de-activated or poisoned by humidity or other substances in the smoke. In addition, the presence of a catalyst in the smoking material or smoking article can adversely affect the flavour of the smoke. Furthermore, many catalysts are only effective at temperatures higher than those at which tobacco smoke is inhaled from a cigarette.

Accordingly, many catalysts that are effective in catalysing the conversion of uncontaminated CO to $CO_2$ in fact prove to be in effective for use in catalysing the conversion in tobacco smoke, as revealed by testing the efficacy of the catalysts under conditions that simulate true smoking conditions.

The present invention is based upon the selection of certain catalysts containing gold for use in oxidising carbon monoxide to carbon dioxide in the decomposition products of smoking material. The selected catalysts are referred to in this specification as "catalysts of the invention".

BRIEF SUMMARY OF THE INVENTION

Broadly, the invention provides a process for treating decomposition products of a smoking material which comprises contacting the decomposition products with a catalyst of the invention.

The invention also includes the use of a catalyst of the invention in the treatment of decomposition products of smoking materials.

The present invention also includes a smoking article or a component thereof comprising smoking material and a catalyst of the invention. The component of the smoking article incorporating the catalyst may be a smoke filter, a wrapper or casing for the smoking article, filter material such as filter tow, or the smoking material itself.

The invention specifically includes a smoke filter comprising a catalyst of the invention.

In order that the invention may be better understood, preferred embodiments thereof will now be described with by way of example only in the following Examples and with reference to the accompanying schematic in which:

BRIEF DESCRIPTION OF THE SEVERAL VIEWS OF THE DRAWINGS

FIG. 1 is a side elevation, partly in longitudinal cross-section and partially broken away of a smoking article with a smoke filter according to the invention.

FIG. 2 is a similar view to FIG. 1 of a smoking article with an alternative smoke filter according to the invention.

In the drawings, similar features are given like reference numerals.

DESCRIPTION OF THE PREFERRED EMBODIMENTS

Catalysts of the invention include, in particular, gold and an oxide of zinc or of titanium. The catalysts of the invention also include gold and a carrier therefor, in which the gold comprises species of gold in the metallic state ($Au^0$), together with species of gold in an oxidised state ($Au^{\delta+}$).

The catalytic mechanism of gold is not fully understood, but our investigations indicate that the activity may depend upon the presence on the surface of the catalyst both metallic gold ($Au^0$) species and positively charged gold species ($Au^{\delta+}$). In the most effective catalysts of the invention, the surface gold species are predominantly metallic. However, metallic gold may not necessarily be the active species in the oxidation of CO; its presence may be necessary only to stabilise oxidised gold species at the interface between the gold and the catalysed species, the oxidised species being instrumental in effecting the catalysis.

The presence and relative proportions of oxidised and metallic gold species can be detected using techniques such as X-ray photo-electron spectroscopy (XPS) and X-ray near-edge surface spectroscopy (XANES).

The relative quantities of the oxidised and metallic species can be changed by appropriate treatment of the catalyst. One method is to treat the gold-bearing catalyst in a reducing atmosphere, for example by contacting the catalyst with hydrogen or carbon monoxide. Reduction could also be effected in the liquid phase, for example by treating the catalyst with a reducing agent such as sodium borohydride, hydrazine or sodium formate.

We have found that if gold is deposited upon titanium oxide for example, the catalytic activity of the gold towards oxidation of carbon monoxide is enhanced by treatment in a reducing atmosphere. Similarly, the catalytic activity of gold on carriers comprising zinc oxide, or mixed oxides of zinc and copper is enhanced by treatment of the catalyst in a reducing atmosphere.

Alternatively the gold-bearing catalyst may be calcined in order to increase the proportion of $Au^0$ species relative to $Au^{\delta+}$ species. Heat treatment of a gold-bearing mixed oxide of zinc and copper at 200° C. for 1 hour for example can effect a reduction of approximately 50% of Au(III) species to metallic gold Au(0), and treatment at 300° C. for 1 hour can achieve a reduction of approximately 95%. However, calcinations may not be as effective as reductive treatment because heat tends to cause sintering of the gold particles, and finely-divided particles, especially nanoparticles, are more effective in catalysis than larger particles.

The smoking article of the invention may take any form. For example the smoking article may be one in which the tobacco is smoked by igniting the smoking material and inhaling the products of combustion, as for example in a cigarette, cigar or cigarillo. Alternatively the smoking article may be one in which the smoking material is heated to a temperature at which decomposition in to pyrolysis products occurs without combustion. Such articles are well known and incorporate electrical or other heating means such as a charcoal element.

In particular the smoking article may comprise a rod of smoking material optionally in a casing, with or without a filter. The casing may be a wrapper of paper, tobacco leaf or reconstituted tobacco. Alternatively, where, for example, the smoking article is intended to produce low emissions of sidestream smoke, or lower levels of pyrolysis products in the mainstream smoke, the casing may be composed of non-combustible inorganic material such as a ceramic material. The filter may be of any suitable material, for example fibrous cellulose acetate, polypropylene or polyethylene, or paper.

The smoking material is preferably tobacco but may be a non-tobacco smoking material. Examples of non-tobacco smoking materials are dried and cured vegetable material, including fruit materials, and a synthetic smoking material such as may be produced from alginates and an aerosol-generating substance such as ethylene glycol. The smoking material may comprise a blend of tobacco and non-tobacco smoking materials. Where the smoking material comprises tobacco, the tobacco may of any suitable type, or a blend thereof, including air-cured, fire-cured, flue-cured, or sun-cured lamina or stem, and may have been processed using any appropriate process. For example, the tobacco may be cut, shredded, expanded or reconstituted. The smoking material may also include conventional additives, such as ameliorants, colorants, humectants (such as glycerol and propylene glycol), and flavourings (such as sugar, liquorice and cocoa).

The catalyst may be incorporated in the smoking material. Accordingly, the invention includes smoking material containing a catalyst of the invention.

Alternatively, where the smoking article comprises a rod of smoking material in a wrapper, the catalyst may be incorporated in the wrapper. The invention therefore includes wrapper material for smoking articles containing a catalyst of the invention. The wrapper may be a cellulose-based material such a paper, or a tobacco based material such as reconstituted tobacco.

As a further alternative, if the smoking article comprises a filter, the catalyst may be incorporated in the filter.

The present invention also includes a smoke filter for a smoking article comprising a catalyst of the invention. The smoke filter may be produced separately from the smoking article, for example in the form of a cigarette or cigar holder, or it may be integrated into the smoking article, for example in the form of a cigarette with a filter tip.

Smoke filters in the form of filter tips may be of any conventional construction. For example it may in the form of a "dalmatian" filter comprising a section of fibrous filter material, such a cellulose acetate, the catalyst of the invention being in particulate form and distributed throughout the section. Alternatively the filter may be in the form of a "cavity" filter, comprising multiple sections, the catalyst of the invention being confined to one such section. For example the porous carbon material may lie between two adjacent section of fibrous filter material.

The smoke filter may also comprise other adsorbent materials such as an ion-exchange resin, a zeolite, silica, alumina or amberlite.

The preferred smoking articles of the invention are cigarettes, comprising a rod of tobacco, wrapper, and a smoke filter, the catalyst of the invention being incorporated in the smoke filter.

The catalysts of the invention may be produced in a range of particle sizes. The maximum particle size will normally not exceed 1400 microns, and will preferably be less than 500 microns, and desirably less than 300 microns. Depending upon the intended application, the minimum particle size may be less than 20 microns, e.g. 10 microns or less, or not less than 100 microns, or not less than 150 microns. Typical average particle sizes will therefore lie in the ranges 500-1000 microns, 300-500 microns, 150 -300 microns and 100-150 microns or 20-100 microns.

The catalytic effect of the catalysts of the invention generally increases as the particle size of the catalyst decrease. However, in smoking articles and smoke filters, the presence of densely-packed materials of small particle size can restrict the flow rate of smoke and adversely affect the draw characteristics of the article or filter. Where the catalyst is to be incorporated in a cavity-type smoke filter for a smoking article, it preferably has an average particle size in the range 150-500 microns, desirably 200-400 microns. Where the catalyst is to be incorporated into a Dalmatian type smoke filter, it may have a smaller particle size, for example 10-100 microns, preferably 20-50 microns or 10-20 microns. Catalysts are prone to poisoning, and both the vapour phase and the particulate phase of smoke are likely to contain catalyst poisons. Accordingly, smoke filters and smoking articles according to the invention preferably include means for protecting the catalyst from, or reducing the exposure of the catalyst to, smoke when in use. This may be achieved in a number of different ways. For example the smoke filter may comprise a filter element upstream of the catalyst of the invention for adsorbing materials from the vapour or particulate phase of smoke before it contacts the catalyst. Such filter elements may comprise a general adsorbent, in particular, activated carbon, which may be in any convenient form, such as threads, particles, granules, cloth, or paper. The filter element may also comprise a selective adsorbent such as an ion-exchange resin, a zeolite, silica, alumina or amberlite. Zinc oxide, and mixed oxides of zinc and other metals such as aluminium, in particular the zinc/aluminium oxides described below, are also suitable materials for protecting the catalyst from the particulate phase of smoke. The means for protecting the catalyst may include two or more filter elements, for example a first filter element, preferably of activated carbon, for adsorbing materials from the vapour phase of smoke, and a second filter element, preferably of zinc oxide or zinc/aluminium oxide, capable of removing particulate material from the smoke. The provision of multiple filter elements in smoke filters and smoking articles is well known, and any conventional configuration of filter, and associated methods of construction, may be used.

The catalyst of the invention may also be mixed with other adsorbent materials in a cavity or dalmatian type filter element.

In the preferred catalysts of the invention, the gold has a particle size less than 100 nanometres (e.g. below 70 nm), advantageously less than 50 nanometres (e.g. below 25 nm) and desirably less than 10 nanometres (e.g. 5 nm or lower). The amount of gold in the catalyst is typically at least 0.01 wt-% of the catalyst, preferably at least 0.05 wt-%, advantageously at least 0.5 wt-%, desirably at least 1.0 wt % and conveniently 2 wt-% or more. The catalysts of the invention tend to be more effective as the amount of gold in the catalyst increases. Preferably however, especially for reasons of cost, the amount of gold in the catalyst should not exceed 5 wt-% and is desirably no more than 4 wt-%.

The preferred catalysts of the invention comprise gold and an oxide of zinc or of titanium. For example, the oxide may be zinc oxide or titanium oxide or a mixture thereof. Preferably, the oxide is in the form of a mixed oxide of zinc and another metal.

The oxide preferably acts as a carrier or support for the gold but other carriers may be used. The carrier may for example comprise graphite, porous carbon, silicon, ceramic materials such as silica, or a zeolite. The carrier, in whatever form, may also include lubricants, to facilitate processing, binders and stabilizers.

Gold is easier to deposit upon substrates that have iso-electric points of from 6 to 10. Where gold is to be deposited upon a mixed oxide of zinc and another metal therefore, the other metal is preferably selected so that the mixed oxide has an iso-electric point of from 6 to 10. Pure zinc oxide has an iso-electric point of about 9, which will alter when mixed with another oxide with a different iso-electric point. Suitable other metals for incorporation in the catalyst therefore include aluminium (which forms the oxide $Al_2O_3$ with an iso-electric point of from 8 to 9), cerium (which forms $CeO_2$ with an iso-electric point of 6.7), titanium (which forms $TiO_2$ with an iso-electric point of 6), zirconium (which forms $ZrO_2$ with an iso-electric point of 6.7) and iron (which forms $Fe_2O_3$ with an iso-electric point of 6.5-6.9) and copper (which forms cupric oxide with an iso-electric point between 6.8 and 7.5).

The more effective catalysts of the invention are those in which gold is present in combination with a mixed oxide of zinc and aluminium or a mixed oxide of copper and zinc. The combination of gold and zinc and aluminium oxides appears to be particularly effective. The aluminium oxide appears to enhance the surface area of the carrier, and to act as a binder to increase the strength of the catalyst.

The mixed oxide may be in the form of a mixture of two oxides of the metals with individual crystal structures, for example a mixture of zinc oxide and aluminium oxide, or a combined oxide of the two metals with a common crystal structure for example, in the case of copper and zinc oxides, rosasite or aurichalcite.

The relative quantities of zinc and the other metal may vary widely. For example, the weight ratio of zinc to the other metal in the mixed metal oxide may vary from 80:1 to 1:80. Typically the weight ratios of zinc to the other metal will be at least 5 and preferably at least 6.5 parts of zinc to 80 parts of the other metal. Higher relative amounts of zinc can be used, e.g. 10, 20, 30, 40, 50, 60, 70, or 80 parts to of zinc to 80 of the other metal. Zinc may be present in greater weight proportions than the other metal, for example in ratios of 2, 5, 10, 20, 30, 40, 50, 60, 70 or 80 parts to 1 of the other metal.

Depending on the method of preparation used, zinc to other metal weight ratios in the range of 80-20:1 are typically useful, preferably 25-65:1, desirably 35-45: 1, especially weight ratios of about 40:1. The foregoing ranges are applicable particularly where the other metal is aluminium, titanium, zirconium, copper or iron. The weight ratio of zinc and aluminium affect the capacity of the mixed oxide as a carrier for the gold.

The ranges referred to in the previous two paragraphs also apply to possible molar ratios of zinc to the other metal. For example the molar ratio of zinc to the other metal may be in the range 80:1 to 1:80, and intermediate values, e.g. 2:1 to 1:2. Preferably the molar ratio of zinc to the other metal is greater than 1:1.

In catalysts containing gold and oxides of zinc and another metal, zinc is the more important metallic element. Although it may be present in amounts as low as 2% by weight of the catalyst, it is preferably present in amounts of at least 5% by weight, preferably at least 10%, desirably at least 15% and advantageously at least 20%, 25 wt % or 30 wt-%. The oxide may be composed predominantly of zinc oxide, and may contain up to 80% by weight of zinc, for example 75 wt-% or, preferably 70 wt-%, or conveniently 65 wt-%, or less, such as 50 wt-%, 45 wt-% or 40 wt-%.

The catalysts of the invention may be prepared using co-precipitation, impregnation, or inverse deposition-precipitation techniques, or by blending metal oxides. South African Patent Application No 2003/8981 describes some possible methods of preparation. Other methods will be apparent to those skilled in the art.

Co-Precipitation

Where co-precipitation is used, gold and the metal oxide or oxides, or precursors thereof, are simultaneously precipitated from solution. With this technique, typically, an aqueous solution containing a water soluble gold compound (for example tetrachloro-auric acid, gold cyanide or sodium chloroaurate) and water soluble salts (for example the nitrates) of zinc and another metal are prepared, using quantities required to produce a desired ratio of gold, zinc and the other metal in the finished mixed metal oxide. The pH of the solution is then increased by the addition of a base (such as ammonium or an alkali metal carbonate or hydroxide (e.g. $NH_4OH$, $NaOH$, $Na_2CO_3$, $K_2CO_3$ or $Li_2CO_3$), or urea) to a point at which gold is precipitated simultaneously with the hydroxides or oxides of zinc and any other metal. This will normally be in the pH range of 7 to 10, depending on the precursors used for the gold and the carrier. The resulting gold-bearing catalyst is separated from the aqueous liquor, washed and dried. Washing is particularly important where the gold is deposited from chloride-containing solutions.

Inverse Deposition-precipitation

Where inverse deposition-precipitation is used, the catalyst is produced by depositing gold from a solution of a gold compound on to a carrier. The resulting gold-bearing carrier is then separated from the liquor and dried.

The carrier may, for example, be made by co-precipitation of the oxides of the two metals, or precursors thereof (for example their hydroxides or carbonates), from an aqueous solution containing soluble salts of the two metals, e.g. their nitrates, using quantities required to produce a desired ratio of zinc and the other metal in the finished mixed metal oxide. The precipitation may conveniently be achieved by adding an aqueous solution of a water-soluble organic or inorganic base, such as an hydroxide or carbonate of an alkali metal (e.g. NaOH, KOH, $Na_2CO_3$, $K_2CO_3$ $Li_2CO_3$) or urea. The precipitation is preferably carried out at a pH at or near the isoelectric points of the mixed oxide, or otherwise at a pH in the range from 2-11, typically pH 7-11 and usually in the range 7-10, e.g. about 8.5. The reaction is also preferably conducted at an elevated temperature, for example from 40 to 110° C., preferably from 60 to 90° C., e.g. about 80° C. and desirably with agitation.

The carrier and precipitate may be allowed to age, for example for a period of at least 1 hour and up to 9 hours. Typically a large batch will be aged for 4 to 8 hours, preferably from 5 to 6 hours. For batches of carrier based on zinc and aluminium oxides with 40:1 weight ratios of zinc to aluminium, an ageing period of about 5 hours at about 70° C. is particularly effective. The ageing may be carried out at temperatures in the range 50-90° C., e.g. 60-80° C. The resulting material is then separated from the solution by filtration.

The carrier and precipitate is then washed, so as to remove unwanted ions, especially sodium and potassium ions, if present. Desirably, the washing process is continued until the sodium or potassium ion concentration falls to a level less than 400 ppm, and preferably less than 300 ppm. The carrier and precipitate is then dried in air. Typically the drying can be conducted at a temperature of from 80° C. to 150° over an appropriate period of time, which will depend on the size of the batch and the drying method used.

The resulting carrier may consist of a mixture of various oxides. The nature of the oxides formed depends upon the period for which the precipitate is aged. For example, in the case of carriers based on zinc and copper, the process typically results in a carrier composed of copper oxide (CuO), rosasite $[Cu_{0.5}Zn_{0.5})_2.(CO_3).(OH)_2]$ and various forms of aurichalcite $[(Cu_xZn_{1-x})_5.(CO_3)_2.(OH)_6]$ with comparatively little zincite (ZnO). The proportion of copper oxide in the carrier increases with the length of the ageing period.

The dried material may then be calcined at a temperature of from 100° C. to 800° C. (preferably at least 200° C., desirably from 300° C. to 500° C., e.g. about 400° C.) and then formed in to a powder, granules, tablets, or extrudate, or otherwise pre-formed. Calcining alters the crystal structure of the mixed oxide. For example, in the case of carriers formed from zinc and copper oxides, calcining at 200° C. for 5 hours reduces the amounts of rosatite and aurichalcite in the composition, and increases the amount of CuO and ZnO. In the case of zinc-aluminium oxides, calcining removes hydrated crystalline hydroxide and carbonate species, for example by converting hydrozincite ($Zn_5(OH)_6(CO_3)_2$) and zinc aluminium carbonate hydrozide hydrate ($Zn_{0.67}Al_{0.33}(OH)_2(CO_3)_{0.165}.H_2O$) to zincite (ZnO). After calcining at 500° C. for 5 hours, both metals are predominantly in their respective oxide phases.

The carrier generally has a surface area of from 4 to 180 $m^2/g$, as determined by the $BET/N_2$ method (ASTM D3037).

Gold is then deposited upon the carrier by treating the carrier with an aqueous solution of a gold precursor. The amount of gold deposited upon the carrier may be controlled by varying the relative proportions of gold solution and carrier, and varying the pH and time of deposition.

Several gold compounds may be used as precursor, for example gold cyanide [AuCN], sodium chloroaurate [$NaAuCl_4$], potassium cyanoaurate [$KAuCN_2$], gold acetylacetonate [$(CH_3)_2Au(CH_3COCH_2COCH_3)$] and, preferably, tetrachloro auric acid [$HAuCl_4$]. The gold precursor is dissolved to form a treatment solution with a gold content that normally lies in the range of from $1\times10^{-1}$ to $1\times10^{-4}$M, preferably in the range $1\times10^{-2}$ to $5\times10^{-3}$M. The treatment solution initially has a pH below 7, preferably in the range of from 1 to 6.5, usually 1.5-3. The pH of the treatment solution may be adjusted to a desired value, e.g. from 2 to 8.5, by adding a suitable alkali such as sodium carbonate solution.

The treatment solution and the carrier are preferably brought into contact at an elevated temperature, preferably in the range 50-90° C., for example about 70° C. In many cases, the gold species in solution undergo chemical changes when subjected to heat and changes in pH. For example, $HAuCl_4$ produces gold species of the general formula $[Au(OH)_nCl_{4-n}]^-$ (where n=1-3). The relative proportions of these species change if the solution is held at an elevated temperature over a period of hours, and these changes lower the level of gold deposited from solution on to the carrier, and lower the ultimate efficiency of the catalyst.

When the pH and temperature of the treatment solution is stabilised, it is contacted with the carrier. Gold is then precipitated from the solution, for example by increasing the pH of the solution to a desired value by adding an alkaline solution of, for example sodium, potassium or ammonium hydroxide or carbonate, or urea. This will normally be in the pH range of 4 to 11. The form in which the gold is deposited will depend upon the precursor used to form the precipitation mixture. For example, it may be deposited from solution as the hydroxide, or deposited as $[Au(OH)_nCl_{4-n}]^-$ (where n=1 to 3). The pH at which deposition occurs affects the nature of the deposit. Gold hydroxy-chloride $[Au(OH)_nCl_{4-n}]^-$ (wherein n=1 to 3) undergoes hydrolysis with increasing pH. Gold hydroxide forms at higher pH values (typically from 7 to 10, preferably 8 to 9.5, e.g. about 8.5). Higher pH values are advantageous because they lead to well-dispersed gold with a low particle size in the nanometer range. In addition, the gold species prevalent at higher pH values contain less chloride. The presence of chloride species is believed to increase the formation of larger gold particles, thereby decreasing catalytic activity, due to the sintering of the gold particles as a result of the formation of Cl—Au—Cl bridges. Residual chloride may also poison catalytic sites.

The suspension of carrier in the gold precursor solution is preferably aged at the reaction temperature, with agitation, for a suitable period, for example 0.5 to 3 hours, preferably about 1 hour. The solid material is then separated by filtration and washed. The washing is preferably carried out with a base, such as aqueous ammonia solution, NaOH or urea, which also assists in the removal of chloride ions. After washing, the catalyst is dried, preferably at a temperature of from 80 to 150° C., e.g. at 120° C. Further washing with an alkaline solution can be carried out on the dried catalyst to remove more chloride, if desired.

Impregnation

In an alternative method of preparation, which is suitable for catalysts comprising gold and mixed oxides of zinc and another metal containing relatively low amounts of zinc relative to the other metal, the oxide of the other metal is first impregnated with zinc, and the gold is then deposited on the resulting material.

For example, zinc oxide can be deposited on to an alumina substrate by contacting the alumina with a solution of a zinc salt for a suitable period (e.g. up to 12 hours at room temperature or 2 hours at an elevated temperature (e.g. about 70° C.)) separating the impregnated alumina from the liquor, and washing, drying and calcining the resulting material. The zinc solution may for example comprise zinc nitrate, or zinc amine complex $[Zn(NH_3)_4]^{2+}$, which is prepared by dissolving zinc nitrate in aqueous ammonium hydroxide. Alternatively the zinc oxide may be deposited upon the substrate by precipitation on to alumina from an aqueous acidic solution of a zinc salt, such as zinc nitrate, by raising the pH of the solution the point at which precipitation of zinc hydroxide occurs by adding an alkaline solution. The precipitate is allowed to stand in contact with the alumina e.g. for up to 24 hours, and the impregnated alumina is then separated from the mother liquor, washed, dried and calcined.

Gold is then deposited on to the impregnated alumina using techniques similar to those described above in relation to the inverse precipitation-deposition process.

Blending

The mixed oxides of zinc and another metal may also be prepared by powdering and blending or otherwise physically mixing the two separate oxides in a desired weight ratio. For example mixed oxides of ZnO and $Al_2O_3$ may be prepared in this way. Gold may then be deposited upon the mixed oxide using the techniques described above. The blends can be shaped or formed using conventional techniques known in the production of catalyst materials. Other carrier materials, e.g. graphite or silicon may be incorporated in the catalyst during the blending process.

Further Treatment of the Gold-bearing Catalyst

The activity of the catalysts can often be modified by further treatment of the gold-bearing catalyst prepared by any of the methods described above. For example, the catalyst may be calcined before use, typically by heating the catalyst to a temperature of from 50 to 500° C. (preferably from 100 to 300° C.) for a period of from 1 to 5 hours. The effect of calcining is to reduce $Au(OH)_3$ and other Au(III) species present in the catalyst to metallic gold thereby producing on the surface of the catalyst species of gold that are in the metallic state ($Au^0$), together with species of gold in an oxidise state ($Au^{\delta+}$).

Alternatively the catalyst may be treated in a reducing atmosphere, for example hydrogen or, preferably, carbon monoxide. Such treatment also affects the nature of the gold species on the surface of the catalyst and produces both $Au^0$ and $Au^{\delta+}$ simultaneously.

Referring to the drawings, FIGS. 1 and 2 illustrate smoking articles in the form of cigarettes having a rod 1 of tobacco encased in a wrapper 2 attached to a smoke filter 3 by means of a tipping paper 4. For clarity, the tipping paper 4 is shown spaced from the wrapper 2, but in fact they will lie in close contact.

In FIG. 1, the smoke filter 3 comprises three cylindrical filter elements 3a, 3b, 3c. The first filter element 3a at the mouth end of the filter is 7 mm in length, composed of cellulose acetate tow impregnated with 7% by weight of triacetin plasticiser having a 25 mm water gauge pressure drop over its length. The second filter element 3b, positioned centrally is a cavity 5 mm in length containing 150 mg of a catalyst according to the invention, which may be as described in any one of the following Examples. The third filter element 3c adjacent the rod 1 is 15 mm in length, has a 90 mm water gauge pressure drop over its length, and comprises 80 mg cellulose acetate tow. The tow is impregnated with 4% by weight of triacetin and has 80 mg of granular activated carbon distributed evenly throughout its volume in a "Dalmatian" style.

The cigarette shown in FIG. 2 is similar to that of FIG. 1 except that the smoke filter 3 has four coaxial, cylindrical filter elements 3a, 3b, 3c and 3d. The first filter element 3a at the mouth end of the cigarette is 5 mm in length, and composed of cellulose acetate tow impregnated with 7% by weight of triacetin plasticiser. The second filter element 3b, positioned adjacent the first filter element 3a is a cavity 5 mm in length containing 200 mg of a catalyst according to the invention, which may be as described in any one of the following Examples. The third filter element 3c adjacent the second filter element 3b is 10 mm in length and comprises cellulose acetate tow impregnated with 7% by weight of triacetin. The fourth filter element 3d lies between the third filter element 3c is 7 mm in length and comprises 80 mg of granular activated carbon. A ring of ventilation holes 5 is formed in the tipping paper 4 in a radial plane A-A which deliver air into the third filter element 3c about 3 mm downstream of the junction with the fourth filter element 3d when smoke is inhaled through the cigarette.

EXAMPLES 1-8

Gold/Zinc-aluminium Oxide Catalysts

Carrier Preparation

A 1.34M aqueous solution of zinc nitrate $[Zn(NO_3)_2 \cdot 6H_2O]$ and a 0.081M aqueous solution of aluminium nitrate $[Al(NO_3)_3 \cdot 9H_2O]$ were mixed together in proportions such that the weight ratio zinc:aluminium was 40:1. The solution was heated to temperature of about 80° C., and the pH of the solution was adjusted from an initial value of 1.1 to a value of 9.1 by adding an aqueous solution of sodium carbonate with stirring, thereby producing a precipitate of the hydroxides of zinc and aluminium. The pH and temperature of the solution were maintained to allow the precipitate to age in contact with the solution for about 5 hours. The precipitate was filtered from the solution, washed with high-purity water to remove unwanted ions, and dried in air at about 120° C. The dried precipitate was then calcined by heating in air at 400° C. The resulting carrier (A) was then ground into a powder. Examination of the crystal structure of the carrier indicated that it consisted of hexagonal zincite, ZnO, and amorphous alumina, $Al_2O_3$, with traces of zinc aluminium carbonate hydroxide hydrate.

The foregoing procedure was repeated with different quantities of zinc and aluminium nitrates, and different reaction conditions, as set forth in Table 1 to produce catalyst carriers B and C with properties as specified in Table 1. For the purposes of comparison, carriers D and E, consisting of zinc oxide and alumina alone were also prepared by a similar process.

TABLE 1

| Carrier No. | Zn:Al ratio, wt % | [Zn(NO$_3$)$_2$] | [Al(NO$_3$)$_3$] | Initial pH$_i$ | Final pH$_f$ | Crystal Structure |
|---|---|---|---|---|---|---|
| A | 40:1 | 1.34M | 0.081M | 1.10 | 9.10 | Zincite (ZnO), amorphous alumina, zinc aluminium carbonate hydroxide hydrate |
| B | 20:1 | 1.34M | 0.163M | 1.90 | 9.03 | Zincite (ZnO), amorphous alumina |
| C | 80:1 | 1.34M | 0.040M | 1.25 | 9.10 | Zincite (ZnO), amorphous alumina |
| D | 0:100 |  | 1.07M | 0.17 | 9.01 | Amorphous alumina |
| E | 100:0 | 1.34M |  | 2.52 | 9.03 | Zincite (ZnO) |

Catalyst Preparation

A volume of deionised water sufficient to support a sample of carrier A in suspension was heated to 70° C. A 5×10$^{-3}$M solution of tetrachloroauric [HAuCl$_4$] acid containing sufficient gold to form 9.2 wt-% on the carrier was heated to 70° C. and added to the water. The pH of the solution was adjusted from an initial pH of 2 to 5.5 by adding a solution of Na$_2$CO$_3$. Having stabilised the temperature and pH, the carrier was added, and the suspension agitated for a period of 1 hour. The solid material was separated and washed with a 0.19M ammonia solution, and dried in air at 120° C.

The above procedure was repeated using carriers A to E with different quantities of tetrachloroauric acid, and wash solutions of different ammonium concentration, as tabulated in Table 2 below to produce the catalysts Examples 1 to 8 in accordance with the invention, and comparative Examples I to IV.

In order to test their catalytic activities, 0.25 g samples of the catalysts of Examples 1 to 8 and comparative Examples I to VI having a particle size fraction of from 700 to 1400 μm were loaded into a continuous fixed-bed micro-reactor through which a test gas consisting of a 1% by volume mixture of CO in air with 100% humidity was passed under adiabatic conditions at a flow rate of 495 ml/min, equivalent to a space velocity (SV) of 118,800 ml.g$^{-1}$.h$^{-1}$ (millilitres of test gas per gram of catalyst per hour). The activity of the catalyst was assessed by measuring the micro mols of CO converted per second per gram of gold on the catalyst (μmolCO.g$_{Au}^{-1}$.s$^{-1}$). The resulting rates of conversion of CO to CO$_2$ are set forth in Table 2.

As can be seen from Table 2, gold, when deposited upon alumina alone (as in examples I and II) does not function as a catalyst for oxidation of CO under the conditions tested. Gold deposited upon zinc oxide (as in Examples III-VI) shows some catalytic function, but the best catalytic function is exhibited by gold when deposited upon a carrier composed of the mixed oxides of zinc and aluminium (as in Examples 1 to 8), especially when the ratio of zinc to aluminium in the carrier is over 20:1 (as in examples 1-3, 7 and 8). Also the catalysts with higher gold loading (2% by weight or more) perform more effectively.

TABLE 2

| Example No | Carrier | Zn:Al wt. ratio | Wash solution strength, [NH$_4^+$] | [Au] wt-% | Activity μmol CO · g$_{Au}^{-1}$ · s$^{-1}$ |
|---|---|---|---|---|---|
| 1 | A | 40:1 | 0.19M | 2.29 | 1758 |
| 2 | A | 40:1 | 0.31M | 2.33 | 2321 |
| 3 | A | 40:1 |  | 3.61 | 1554 |
| 4 | B | 20:1 | 0.19M | 2.21 | 629 |
| 5 | B | 20:1 |  | 2.09 | 649 |
| 6 | B | 20:1 | 0.31M | 2.13 | 606 |
| 7 | C | 80:1 | 0.31M | 2.59 | 1934 |
| 8 | C | 80:1 |  | 1.72 | 789 |
| I | D | 0:100 | 0.19M | 0.092 | 0 |
| II | D | 0:100 |  | 0.296 | 0 |
| III | E | 100:0 | 0.19M | 2.60 | 1456 |
| IV | E | 100:0 | 0.31M | 2.72 | 1375 |
| V | E | 100:0 | 0.62M | 2.71 | 1317 |
| VI | E | 100:0 |  | 1.18 | 1150 |

EXAMPLES 9 to 14

Gold/Copper-zinc Oxide Catalyst

Samples of catalyst comprising gold on a carrier consisting of the mixed oxides of copper and zinc were prepared using an inverse deposition-precipitation method similar to that described in relation to Examples 1-8. To prepare the carriers, solutions of Cu(NO$_3$)$_2$.3H$_2$O and Zn(NO$_3$)$_2$.6H$_2$O with various copper:zinc molar ratios as set forth in Table 3 below were mixed and heated to 80° C., and the pH was adjusted to a value of 8.5 with an aqueous Na$_2$CO$_3$ solution. The pH and temperature were maintained for 5 hours during precipitation. Thereafter, the resulting precipitates were filtered, washed several times with deionised water and dried overnight at 120° C. The powders were then calcined either at 200° C. for 1 hour, or at 300° C. for 5 hours. The calcined material was then pelletised, crushed and sieved to a particle size range of 500 to 1000 μm.

The samples of the carriers were each deposition-precipitated with gold using an aqueous solution of HAuCl$_4$ of desired concentration. This solution was preheated to 70° C. and the pH adjusted to 8.5 by adding Na$_2$CO$_3$ solution. The carriers were then added to separate batches of the gold solution and each aged for 1 hour at 70° C. without pH control. Thereafter, the catalysts were filtered, washed several times with deionised water, dried in a desiccator and calcined.

In order to assess the catalytic activity of the samples in relation to the oxidation of carbon monoxide, CO oxidation activity measurements were performed under adiabatic conditions in a micro fixed-bed reactor. The gas (1% CO in air) was passed over 0.5 g of catalyst at a flow rate of 60 ml/min and the CO conversion monitored by means of an on-line gas chromatograph equipped with a methaniser utilising a flame ionisation detector. Tests were carried out using either dry gas or gas with 100% humidity.

For the purposes of comparison, tests were also carried out on samples of the carrier with Cu:Zn ratios of 1:2, 1:1 and 2:1, that had not been treated with gold. Each sample had a very low catalytic activity under dry and humid conditions, less than $0.02\ \mu mCO \cdot g_{Cat}^{-1} \cdot s^{-1}$.

All the samples carrying gold exhibited significant catalytic activity, especially those that contained zinc in the form of zincite (ZnO) rather than rosasite or aurichalcite as a result of calcination of the carrier at higher temperatures. Also, the activity of the catalysts is increased by 50-100% under humid conditions.

TABLE 3

| Example No | Cu:Zn | Au, wt-% | Calcination Temp. (° C.) 0 | Activity (dry) $\mu m\ CO \cdot g_{Au}^{-1} \cdot s^{-1}$ | Activity (wet) $\mu m\ CO \cdot g_{Au}^{-1} \cdot s^{-1}$ |
|---|---|---|---|---|---|
| 9 | 1:2 | 4.2 | 200 | 38 | |
| 10 | 1:1 | 4.7 | 200 | 31 | |
| 11 | 2:1 | 4.3 | 200 | 40 | |
| 12 | 1:2 | 5.2 | 300 | 103 | 149 |
| 13 | 1:1 | 5.3 | 300 | 91 | 171 |
| 14 | 2:1 | 4.9 | 300 | 104 | 180 |

EXAMPLES 15-23

Calcination of Gold/Copper-zinc oxide

A batch of carrier prepared using the method described for examples 9 to 14, with a Cu:Zn ratio of 1:1 was calcined in air at 300° C. for 5 hours to ensure full conversion of the copper and zinc oxides to CuO and ZnO. The resulting carrier was treated with gold as describe with reference to Examples 9-14, to produce a catalyst with a gold content of 7.7 wt-%. Batches of the catalyst were then calcined for various periods and at different temperatures as indicated in Table 4 below, and their catalytic activity measured under dry conditions, as described with reference to Examples 9 to 14. The activity of an uncalcined sample was also tested.

TABLE 4

| Example No | Calcination Temp. (° C.) | Calcination Time (hours) | Activity (dry) $\mu molCO \cdot g_{Au}^{-1} \cdot s^{-1}$ |
|---|---|---|---|
| 15 | Uncalcined | Uncalcined | 76 |
| 16 | 100 | 2 | 62 |
| 17 | 200 | 2 | 58 |
| 18 | 250 | 2 | 45 |
| 19 | 300 | 2 | 108 |
| 20 | 400 | 2 | 147 |
| 21 | 100 | 4 | 42 |
| 22 | 250 | 4 | 32 |
| 23 | 400 | 4 | 93 |

The catalysts calcined for 2 hours at 300° C. or more performed better than those calcined for the same period at lower temperatures, which is attributable to the reduction of Au (III) species to Au(0). However, prolonged calcination at high temperatures produces a reduction in activity, which can be attributed to sintering of the gold species into larger, less active particles.

EXAMPLES 24-29

CO Reduction in Tobacco Smoke

The following examples relate to tests carried out on equipment that simulates smoking of cigarettes incorporating smoke filters, the catalyst being incorporated in the filter.

The test equipment comprised a standard smoking engine as used in the tobacco industry, connected to a carbon monoxide analyser which is in turn connected to one end of a catalyst holder. The other end of the catalyst holder is adapted to receive a cigarette. The catalyst holder was in the form of a tube 27 mm in length and 7.83 mm diameter, with a volume of 1300 mm³, closed at each end by plugs of cellulose acetate 5 mm in length, defining a central chamber of 665 mm³ which was filled with filter elements and catalysts to be tested.

The catalyst had a density of 1.19 g/cm³, a particle size in the range 500-1000 microns and consisted of a carrier of mixed zinc and aluminium oxides ("AuZnAlO$_x$") prepared in accordance with the method of Examples 1 to 4 with a gold loading of 1.1 wt-%, and calcined after treatment with gold. This catalyst was tested alone, and also in conjunction with up to three other filter elements consisting of beds of activated carbon powder (density 0.55 g/cm³) ("AC") and the zinc/aluminium oxide carrier (density 1.06 g/cm³) ("ZnAlO$_x$") arranged adjacent the catalyst, and upstream thereof, to provide protection for the catalyst against poisoning by the particulate phase of the smoke. The compositions of the filter beds and their relative sizes and configuration are indicated schematically in Table 5. For the purposes of comparison, tests were also carried out on a control sample containing only carrier material charcol.

In use, with a lighted cigarette having a 6 mg TAR delivery (sold under the trade mark Benson & Hedges Ultra Mild) in the catalyst holder, the smoking engine drew puffs of smoke through the equipment at a rate such that 35 ml of smoke were drawn over a 2-second interval once every minute. The carbon monoxide analyser produced information about the carbon monoxide content of the smoke at each puff. Three tests were carried out on each of the filter materials, and the results for each puff of the three tests averaged. The average reduction in carbon monoxide in the smoke over 8 puffs for the various combinations of catalyst and filter elements tested compared with the control sample are shown in the table.

TABLE 5

| Example No. | Filter bed loadings Downstream ------------------------ Upstream | Average % CO reduction over 8 puffs |
|---|---|---|
| 24 | 100% catalyst (777 mg) | 16 |
| 25 | 75% catalyst (583 mg) 25% AC | 18 |
| 26 | 50% Catalyst (338 mg) 50% AC | 26 |
| 27 | 50% Catalyst (338 mg) 25% AC 25% ZnAlOx | 34 |
| 28 | 50% Catalyst (338 mg) 10% AC 25% ZnAlOx 15% AC | 19 |
| 29 | 35% Catalyst 15% AC 25% ZnAlOx 25% AC (272 mg) | 30 |

The catalyst alone produced 16% reduction in CO in the smoke, compared with the control sample. By providing protective filter elements upstream of the catalyst, the reduction in CO could be increased to 34%, using less catalyst. Zinc/aluminium oxide compositions protect the catalyst effectively, as does activated charcoal. The presence of activated charcoal immediately upstream of the catalyst significantly improves CO reduction. The amount of catalyst required can be reduced by using zinc oxide in combination with activated charcoal.

EXAMPLE 30

Effect on Particulate Phase of Tobacco Smoke

Since the particulate phase of tobacco smoke includes substances that contribute to the flavour of the cigarette, it is important to ensure that any filter element protects the catalyst from poisoning without removing excessive quantities of particulate phase. In a further series of tests to investigate the extent to which zinc/aluminium oxide adsorbs particulate matter, cigarettes were smoked through test smoke filters a rate of 35 ml puffs of 2 seconds duration at one minute intervals using a conventional smoking machine and a particulate phase trap comprising a standard "Cambridge" filter. A filter element consisting of 170 mg of the zinc/aluminium oxide retained between two plugs of standard cellulose acetate filter material was found to remove an average of 14% of the particulate matter from the particulate phase of the tobacco smoke (3.5 µg of particulate matter per mg of filter material). This compares favourably with a filter consisting solely of 133 mg of cellulose acetate, which was found to remove from 8.5 to 10.5 mg of particulate matter (6.4 to 8.1 mg of particulates per mg of cellulose acetate). The zinc/aluminium oxide therefore protects the catalyst from poisoning whilst removing less particulate matter than a similar amount of cellulose acetate.

EXAMPLES 31 to 35

Gold/Zinc-aluminium Oxide, Pre-treatment in CO/Air Reducing Atmosphere

The equipment used in Examples 24-29 was used to compare the performance of catalysts that had been treated in a reducing atmosphere, with that of an untreated catalyst.

The carrier for the catalysts comprised a commercially available mixed oxide of zinc and aluminium consisting of a 90% zincite (ZnO) and 10% alumina ($Al_2O_3$). Using the process described in relation to examples 1 to 4, with no final calcinations, five samples of the carrier were impregnated with gold at pH levels of 5.5 or 8.5, resulting in catalysts with the gold loadings as set forth in Table 6. Each sample was divided into two batches. One batch was left untreated, the other was pre-treated in a reducing atmosphere of 1.25% CO in air.

The procedure described above in relation to Examples 24-29 was used to test the effect of the catalysts with and without pre-treatment on the carbon monoxide content of a test gas consisting of 1.25% by volume CO in air mixture under simulated smoking conditions of 35 ml puffs of 2 second duration at one minute intervals. In each case the filter comprised a bed containing 60 mg of activated carbon, upstream of a bed of 200 mg of the catalyst.

The average % reductions in CO in four tests, as measured on the $1^{st}$ and $8^{th}$ puffs, are set forth in Table 6.

TABLE 6

| | | | Average % reduction in CO over 4 tests | | | |
|---|---|---|---|---|---|---|
| | Catalyst | Catalyst Gold | Without pre-treatment | | With pre-treatment | |
| Example No. | Preparation pH | Loading (wt-%) | $1^{st}$ puff | $8^{th}$ puff | $1^{st}$ puff | $8^{th}$ puff |
| 31 | 8.5 | 0.48 | 24 | 13 | 47 | 42 |
| 32 | 5.5 | 0.56 | 19 | 9 | 72 | 62 |
| 33 | 8.5 | 3.34 | 43 | 65 | 89 | 86 |
| 34 | 5.5 | 2.86 | 25 | 12 | 56 | 40 |
| 35 | 8.5 | 4.95 | 24 | 15 | 87 | 82 |

The results set forth in Table 6 indicate that pre-treatment of uncalcined catalyst in a reducing atmosphere significantly improves the performance of the catalyst in reducing CO in tobacco smoke. In addition, the pre-treated catalyst has a more stable performance over the 8-puff sequence, in that, in the pre-treated catalyst, the values for CO reduction at the $1^{st}$ and $8^{th}$ puff are closer together than the corresponding values for the catalyst without pre-treatment.

EXAMPLES 36-41

Gold/Aluminium-zinc Oxide and Gold/Copper-zinc Oxide: Pre-treatment in Reducing Atmospheres Gold catalysts were prepared by depositing gold on to two carriers composed of a commercially available zinc-aluminium oxide (supplied by Süd-Chemie under product reference No G72D and a commercially available copper-zinc oxide (supplied by Süd-Chemie under product reference No G66B). In each case the carrier was crushed and sieved to a particle size in the range 500-1000 µm, and added to a solution of $HAuCl_4$ at 70° C. containing gold in a concentration sufficient to provide the gold loading of 0.84 wt.-% on the zinc-aluminium oxide carrier and 1.2 wt.-% on the copper-zinc carrier. The pH of the solution was adjusted to a value of 8.5 for the zinc-aluminium oxide and 8.0 for the copper-zinc oxide using a 0.5M solution of sodium carbonate. After ageing for 1 hour at whilst maintaining the temperature and pH, the resulting catalysts were filtered off, washed several times with demineralised water to remove excess sodium and chloride ions, and dried overnight at 120° C. so that the deposited gold was predominantly in the Au(III) oxidation state.

Samples of 5 g of each catalyst were then contacted in a fluidised bed reactor with reducing atmospheres consisting of a dry 1.45% carbon monoxide-air mixture; a humidified 1.45% carbon monoxide-air mixture, a 10% hydrogen-argon mixture and, for comparison purposes, air, at flow rates of 10 litres/min for the periods and at the temperatures indicated in Table 7 below. The reductive process caused a change in colour of the catalyst from light yellow or white (in the case of oxides of zinc) in the oxidised state, to purple in the reduced state, which can be attributed to the change in oxidation state of the deposited gold from the oxidised state to a mixture of species comprising metallic gold and oxidised species:

$$Au^{3+} \rightarrow Au^0 + Au^{\delta+}$$

The activities of the resulting catalysts on the oxidation of CO were compared by using a smoking engine to draw a 1.45% CO in air mixture from a pre-filled gas-tight bag over a bed of 200 mg of the catalyst packed in a glass tube and retained therein by glass wool plugs under ISO smoking conditions (i.e. 35 ml puffs of 2-second duration at one minute intervals). The emerging gas was analysed using a commercially available carbon monoxide infra-red analyser sold under the trade name Signal 7000GFG. The % conversions of CO to $CO_2$ in the $1^{st}$ and $8^{th}$ puff are shown in Table 7 below.

TABLE 7

| Example No | Treatment conditions | Au/ZnAlO$_x$ 0.84 wt-% Au % CO conversion | | Au/CuZnO$_x$ 1.2 wt-% Au % CO conversion | |
|---|---|---|---|---|---|
| | | $1^{st}$ puff | $8^{th}$ puff | $1^{st}$ puff | $8^{th}$ puff |
| 36 | None | 11 | 50 | 23 | 12 |
| 37 | Air, 6 mins, ambient temp. | 10 | 48 | 22 | 10 |
| 38 | Dry CO/air, 3 mins, ambient temp. | 88 | 78 | 82 | 58 |
| 39 | Dry CO/air, 6 mins, ambient temp | 90 | 83 | 88 | 59 |
| 40 | CO/$H_2$O/air, 6 mins, ambient temp | 85 | 73 | 67 | 36 |
| 41 | $H_2$/Ar, 60 mins, 120° C. | 83 | 73 | 31 | 35 |

As can be seen from Table 7, whilst the activities of the untreated catalysts and catalysts treated in air increase over the 8-puff test period, the activities of the catalysts that were pre-treated in a reducing atmosphere are significantly enhanced in comparison. This enhancement of activity correlates with the increase in Au(0) species present in gold deposited upon the carrier.

EXAMPLES 42-44

Au/Aluminium-zinc Oxide and Au/Copper-zinc Oxide: Pre-treatment by Calcination

Samples of 5 g of each of the catalysts prepared for Examples 36-41 were subject to calcinations at 200 and 300° C. for 2 hours in static air. Temperature programmed reduction tests on the resulting catalysts confirmed that at 300° C., the gold species are almost completely reduced to the Au(0) state, whereas, after calcination at 200° C., approximately half the original Au(III) remains.

The catalytic effects of the samples upon carbon monoxide were tested according to the procedure used in Examples 36-41. The results are shown in Table 8 below.

TABLE 8

| Example No. | Calcination conditions | Au/ZnAlO$_x$ 0.84 wt-% Au % CO conversion | | Au/CuZnO$_x$ 1.2 wt-% Au % CO conversion | |
|---|---|---|---|---|---|
| | | $1^{st}$ puff | $8^{th}$ puff | $1^{st}$ puff | $8^{th}$ puff |
| 42 | None | 11 | 50 | 23 | 12 |
| 43 | 200° C., 2 h | 22 | 78 | 24 | 26 |
| 44 | 300° C., 2 h | 40 | 65 | 22 | 21 |

As can be seen from Table 8, heat treatment, especially at the higher temperature, enhances the activities of the catalysts and sustains their performances over the 8-puff cycle in comparison with the untreated samples. Low temperature reductive pre-treatments were more beneficial. This activity is also consistent with the transformation of Au(III) species to Au(0) caused by calcination.

EXAMPLES 45-48

CO Reduction in Tobacco Smoke

The procedure described above in relation to Examples 24-29 was used to compare the catalytic activity of gold deposited upon various carriers when exposed to tobacco smoke in equipment that simulates smoking of cigarettes incorporating smoke filters.

The following materials were tested for catalytic activity, all of which had particle sizes in the range 500-1000 microns:
  A. Hopcalite, a mixed oxide of copper and manganese on which 0.5 wt-% gold had been deposited, with no pre-treatment in a reducing atmosphere.
  B. A mixed oxide of copper and zinc with a CuO:ZnO ratio of 2:1 on which 3.4 wt-%, gold had been deposited using process similar to that of Examples 9-14, with pre-treatment in a reducing atmosphere of a 1.5 vol.-% CO in air mixture.
  C. Commercially available titanium oxide on which 0.5 wt-% gold had been deposited, and which was subject to pre-treatment in a reducing atmosphere of 1.5 vol.-% CO in air mixture.
  D. Commercially available titanium oxide on which 3.0 wt-% gold had been deposited, and which was subjected to pre-treatment in a reducing atmosphere of 1.5 volume-% CO in air mixture.
  E. The zinc/aluminium oxide carrier used in Example 27, on which 4.9 wt-% of gold had been deposited, and which was subjected to pre-treatment in a reducing atmosphere of 1.5 volume-% CO in air mixture.
  F. The copper-zinc oxide of sample B, on which 1.5 wt-% gold had been deposited, and which had been subjected to pre-treatment in a reducing atmosphere of 1.5 volume-% CO in air mixture.

Each of the catalysts was loaded into a 3-part filter bed comprising an upstream section containing 100 mg of zinc/ aluminium oxide, a middle section containing 60 mg of activated carbon, and a downstream section containing 200 mg of the catalyst.

The average % reduction of CO in the $1^{st}$ and $8^{th}$ puff over four tests results, compared with a control sample containing the carrier material alone, are summarised in Table 9, together with average reduction over all 8 puffs.

TABLE 9

| Example No | Carrier | Gold Loading (wt-%) | Average % reduction in CO over 4 tests | | |
|---|---|---|---|---|---|
| | | | $1^{st}$ puff | $8^{th}$ puff | Average over 8 puffs |
| 45 | A (Cu—Mn oxide) | 2.0 | 0 | 0 | 0 |
| 46 | B (Cu—Zn Oxide) | 3.4 | 91 | 36 | 48 |
| 47 | C (TiO$_2$) | 0.5 | 50 | 0 | 2 |
| 48 | D (TiO$_2$) | 3.0 | 75 | 21 | 32 |
| 49 | E (Zn—Al oxide) | 4.9 | 99 | 48 | 63 |
| 50 | F (Cu—Zn oxide) | 1.6 | 74 | 15 | 18 |

Whereas gold deposited upon hopcalite (a mixed oxide of copper and manganese) had no catalytic activity under the test conditions, gold deposited upon titania exhibited some initial catalytic activity, especially when the catalyst was pre-treated in a reducing atmosphere.

EXAMPLES 51-53

Variation of Activity with Particle Size

Using the process described with respect to the production of the catalysts used in Examples 36-44, the material based on zinc-aluminium oxide, was pelletised, crushed and sieved into three samples with particle sizes in the ranges 100-150, 150-300, 300-500 and 500-1000 microns respectively and then impregnated with gold. The catalytic activities of the samples were then tested using the procedure described in Examples 36-44 using a 1.43% CO in air mixture. The results are summarised in Table 10 and are compared with the performance of a control sample containing no catalyst.

TABLE 10

| Example No. | Wt % Au | Particle size range (microns) | % CO Concentration after treatment | |
|---|---|---|---|---|
| | | | $1^{st}$ Puff 1 | $8^{th}$ Puff |
| Control | n/a | n/a | 1.38 | 1.43 |
| 51 | 0.54 | 500-1000 | 0.44 | 0.64 |
| 52 | 0.58 | 300-500 | 0.11 | 0.23 |
| 53 | 0.62 | 150-300 | 0.02 | 0.07 |

As can be seen from the Table, a significant increase in activity is achieved by using catalysts with smaller particle size. This effect is probably caused by mass transfer limitations within the catalyst particles. By decreasing the particle size, the diffusion distances for the molecules of CO to reactive sites on the catalyst is decreased, enabling the catalyst to operate more efficiently. This phenomenon is particularly prominent at low concentrations of CO. In more concentrated CO-air mixtures, for example with CO/air mixtures of 3.0% by vol., the effect of particle size is less significant. With higher concentrations of CO, the rate of reaction is increased, and more heat is generated by the exothermic reaction. Gas diffusion is therefore increased and the mass transfer limitations apparent at low CO concentrations are not observed. The system changes from being controlled by kinetics rather than mass transfer.

The invention claimed is:

1. A smoking article comprising a smoking material selected from the group consisting of tobacco, a non-tobacco smoking material, or combinations thereof and a catalyst for the oxidation of carbon monoxide in the smoking decomposition products of the smoking material to carbon dioxide, wherein the catalyst comprises gold and a carrier therefore, wherein the carrier comprises a mixed oxide of zinc and another metal and wherein the weight ratio of zinc to said another metal in the mixed oxide is at least 20:1, and the gold comprises species of gold that are predominantly in the metallic state) (Au$^0$) together with species of gold in an oxidized state (Au$^{\delta+}$).

2. A smoking article according to claim 1 wherein the catalyst comprises said gold and a mixed oxide of zinc and a metal forming an oxide with an iso-electric point of from 6 to 10.

3. A smoking article according to claim 1 wherein the catalyst comprises said gold and a mixed oxide of zinc and aluminum.

4. A smoking article according to claim 1 wherein the catalyst comprises said gold and a mixed oxide of zinc and copper.

5. A smoking article according to claim 1 wherein the catalyst is produced by depositing gold from a solution of a gold compound on to the mixed oxide of zinc and another metal, and separating the gold-bearing oxide from the solution.

6. A smoking article according to claim 5 wherein said gold-bearing oxide is calcined.

7. A smoking article according to claim 5 wherein said gold-bearing oxide is treated in a reducing atmosphere.

8. A smoking article according to claim 1 comprising a rod of said smoking material and a smoke filter, and wherein said catalyst is incorporated in the smoke filter.

9. A smoking article according to claim 1 comprising a rod of said smoking material and wherein said catalyst is incorporated in said rod.

10. A smoking article according to claim 1 comprising a rod of said smoking material in a wrapper, and wherein said catalyst is incorporated in said wrapper.

11. A process for treating decomposition products of a smoking material comprising contacting the decomposition products with a catalyst for oxidising carbon monoxide to carbon dioxide, wherein the catalyst comprises gold and a carrier therefore, wherein the carrier comprises a mixed oxide of zinc and another metal and wherein the weight ratio of zinc to said another metal in the mixed oxide is at least 20:1, and the gold comprises species of gold that are predominantly in the metallic state) (Au$^0$) together with species of gold in an oxidized state (Au$^{\delta+}$).

12. A method of manufacturing a smoking article comprising preparing a catalyst material comprising gold and a carrier therefore, wherein the carrier comprises a mixed oxide of zinc and another metal and wherein the weight ratio of zinc to said another metal in the mixed oxide is at least 20:1, wherein the gold comprises species of gold that are predominantly in the metallic state) (Au$^0$), together with species of gold in an oxidized state (Au$^{\delta+}$), and incorporating the catalyst in the smoking article such that when smoked the catalyst is brought into contact with the products of combustion.

13. A smoke filter for a smoking article comprising a catalyst comprised of gold and a carrier therefore, wherein the carrier comprises a mixed oxide of zinc and another metal and wherein the weight ratio of zinc to said another metal in the mixed oxide is at least 20:1, wherein the gold comprises species of gold that are predominantly in the metallic state ($Au^0$) together with species of gold in an oxidized state ($Au^{\delta+}$).

14. A filter according to claim 13 further comprising at least one filter element for protecting said catalyst from particulates in smoke drawn through said filter.

15. A filter according to claim 14 wherein said at least one filter element comprises an oxide of zinc.

16. A filter according to claim 14 wherein said at least one filter element comprises activated carbon.

17. A smoke filter according to claim 13 comprising a holder for a smoking article and a filter element comprising said catalyst.

18. A filter according to claim 13, wherein the catalyst is comprised in filter tow.

19. Casing for a smoking article, the casing comprising a catalyst comprised of gold and a carrier therefore, wherein the carrier comprises a mixed oxide of zinc and other metal and wherein the weight ratio of zinc to said other metal in the mixed oxide is at least 20:1, wherein the gold comprises species of gold that are predominantly in the metallic state ($Au^0$), together with species of gold in an oxidized state ($Au^{\delta+}$).

20. Casing according to claim 19, wherein the casing is a wrapper for a smoking article.

21. A smoking material comprising tobacco and/or non-tobacco smoking material and a catalyst for the oxidation of carbon monoxide in the smoking decomposition products of the tobacco and/or non-tobacco smoking material to carbon dioxide, wherein the catalyst comprises gold and a carrier therefore, wherein the carrier comprises a mixed oxide of zinc and another metal and wherein the weight ratio of zinc to said another metal in the mixed oxide is at least 20:1, and the gold comprises species of gold that are predominantly in the metallic state ($Au^0$) together with species of gold in an oxidized state ($Au^{\delta+}$).

22. A smoking article according to claim 1, wherein the weight ratio of zinc to the other metal in the mixed oxide is in the range of 20-80:1.

23. A smoking article according to claim 22, wherein the weight ratio of zinc to the other metal in the mixed oxide is in the range of 40-80:1.

24. A smoking article according to claim 1, wherein the gold loading of the catalyst is at least 2% by weight.

25. A smoking article according to claim 22, wherein the gold loading of the catalyst is at least 2% by weight.

26. A smoking article according to claim 23, wherein the gold loading of the catalyst is at least 2% by weight.

27. A smoking article as claimed in claim 5, wherein said mixed oxide is calcined at a temperature of 100-800° C. prior to said depositing of said gold.

28. A smoking article as claimed in claim 27, wherein said temperature is 300-500° C.

29. A smoking article as claimed in claim 27, wherein said mixed oxide is calcined at 500° C. for 5 hours prior to said depositing of said gold.

30. A smoking article as claimed in claim 27, wherein said depositing of said gold comprises contacting said solution of a gold compound and said mixed oxide at a temperature of 50-90° C. and adjusting the pH of the solution to pH 7-10.

31. A smoking article as claimed in claim 6, wherein said calcination comprises heating said gold-bearing oxide at a temperature of 100-300° C. for 1-5 hours.

32. A smoking article as claimed in claim 31, wherein said calcination comprises heating said gold-bearing oxide at 300° C. for 1 hour.

33. A smoking article as claimed in claim 7, wherein said treatment comprises contacting said gold-bearing oxide with hydrogen or carbon monoxide.

34. The method of claim 12 wherein said gold is deposited on said carrier, and said mixed oxide is calcined at a temperature of 100-800° C. prior to the depositing of said gold, thereby forming a gold-bearing oxide.

35. The method of claim 34, wherein said temperature is 300-500° C.

36. The method of claim 34, wherein said mixed oxide is calcined at 500° C. for 5 hours prior to the depositing of said gold.

37. The method of claim 34, wherein the depositing of said gold comprises contacting a solution of a gold compound and said mixed oxide at a temperature of 50-90° C. and adjusting the pH of said solution to pH 7-10.

38. The method of claim 34, wherein said gold-bearing oxide is calcined.

39. The method of claim 38 wherein the calcination of said gold-bearing oxide comprises heating said gold-bearing oxide at a temperature of 100-300° C. for 1-5 hours.

40. The method of claim 38, wherein the calcination of said gold-bearing oxide comprises heating said gold-bearing oxide at 300° C. for 1 hour.

41. The method of claim 34, wherein said gold-bearing oxide is treated in a reducing atmosphere.

42. The method of claim 41, wherein said treatment comprises contacting said gold-bearing oxide with hydrogen or carbon monoxide.

\* \* \* \* \*

UNITED STATES PATENT AND TRADEMARK OFFICE Certificate

Patent No. 8,104,484 B2

Patented: January 31, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter James Branton, Southampton (GB); Stephen John Roberts, Weltevreden Park (ZA); Elma van der Lingen, Johannesburg (ZA); and Jason Scott McPherson, Witkoppen (ZA).

Signed and Sealed this Fourth Day of June 2013.

PHILIP C. TUCKER
*Supervisory Patent Examiner*
Art Unit 1745
Technology Center 1700